(12) United States Patent
Ishida et al.

(10) Patent No.: US 7,813,004 B2
(45) Date of Patent: Oct. 12, 2010

(54) IMAGE FORMING APPARATUS, IMAGE FORMING METHOD AND PROGRAM PRODUCT

(75) Inventors: Masanori Ishida, Kagoshima (JP); Masaru Hoshino, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 703 days.

(21) Appl. No.: 11/821,904

(22) Filed: Jun. 26, 2007

(65) Prior Publication Data
US 2008/0123120 A1 May 29, 2008

(30) Foreign Application Priority Data
Jun. 26, 2006 (JP) ............... 2006-174940

(51) Int. Cl.
*G06F 19/00* (2006.01)
(52) U.S. Cl. ....................... 358/1.9; 358/518
(58) Field of Classification Search ............ 358/1.1, 358/1.9, 3.23, 500, 501, 518, 523
See application file for complete search history.

(56) References Cited

U.S. PATENT DOCUMENTS 5,177,603 A * 1/1993 Kojima ................ 358/518

2005/0168495 A1 * 8/2005 Nakatani et al. ............ 345/690
2006/0088208 A1 * 4/2006 Nako et al. ................. 382/162

FOREIGN PATENT DOCUMENTS

| JP | 2002-224821 | 8/2002 |
|---|---|---|
| JP | 2003-283848 | 10/2003 |
| JP | 2006-172381 | 6/2006 |
| JP | 2007-129447 | 5/2007 |
| JP | 2007-129477 | 5/2007 |

* cited by examiner

*Primary Examiner*—Thomas D Lee
(74) *Attorney, Agent, or Firm*—Nutter McClennen & Fish LLP; John J. Penny, Jr.; Michael P. Visconti, III

(57) ABSTRACT

An image input section is operable to input a multicolor image. A mixing ratio input section is operable to input a first mixing ratio which includes first ratios for mixing each of a plurality of color components. A calculating section is operable to calculate a second mixing ratio which includes second ratios for mixing each of a plurality of color components according to the input first mixing ratio so that the sum total of the second ratios is made to be substantially constant. A forming section is operable to mix a plurality of color components of the multicolor image in response to the calculated second mixing ratio, thereby forming a first monochrome image.

10 Claims, 5 Drawing Sheets

US 7,813,004 B2

IMAGE FORMING APPARATUS, IMAGE FORMING METHOD AND PROGRAM PRODUCT

The disclosure of Japanese Patent Application No. 2006-174940 filed Jun. 26, 2006 including specification, drawings and claims is incorporated herein by reference in its entirety.

BACKGROUND

The present invention relates to an image forming apparatus, an image forming method and a program product for forming a monochrome image such as a black and white image from a multicolor image such as a color image.

In the related-art apparatus for forming a black and white image from a color image, for example, image editing software "PHOTOSHOP" (registered trademark) produced by Adobe Systems Incorporated, when a channel mixer function is used, a user mixes basic colors which compose a color image, by a desired ratio, so that a black and white image can be generated from a color image.

However, in the related-art apparatus, in a case where a black and white image is formed by setting a mixing ratio of each of color components, luminance of the thus formed black and white image depends on the sum total of mixing quantities of respective basic colors. Accordingly, when the mixing ratio of each of color components is independently changed, the sum total may be made too small or too large. As a result, the image may be deformed and it may become difficult to visualize the image. Therefore, it is difficult to adjust the mixing ratio of respective basic colors while visualizing the image.

SUMMARY

In order to solve the above problems, according to an aspect of the invention, there is provided an image forming apparatus comprising:

an image input section operable to input a multicolor image;

a mixing ratio input section operable to input a first mixing ratio which includes first ratios for mixing each of a plurality of color components;

a calculating section operable to calculate a second mixing ratio which includes second ratios for mixing each of a plurality of color components according to the input first mixing ratio so that the sum total of the second ratios is made to be substantially constant;

a forming section operable to mix a plurality of color components of the multicolor image in response to the calculated second mixing ratio, thereby forming a first monochrome image.

With the above configuration, the multicolor image is input and at the same time the first mixing ratio representing the first ratios for mixing each of the color components is input. According to this first mixing ratio, the second mixing ratio is calculated so that the sum total of the second ratios can be made to be substantially constant. According to this second mixing ratio, the color components are mixed with each other so that the first monochrome image can be formed. Accordingly, since the sum total of respective second ratios can be maintained, even when one of second ratios which corresponds to one basic color is decreased, the sum of the others of second ratios which are correspond to the residual basic colors is increased in accordance with the decrease. Accordingly, the visibility of the image can be maintained without greatly decreasing the luminance. Accordingly, a deformation of the image caused by the first mixing ratio, which has been set, can be suppressed and the mixing ratios of respective basic colors can be adjusted while watching the image.

The forming section may be operable to mix the color components of the multicolor image in response to the input first mixing ratio, thereby forming a second monochrome image; and the image forming apparatus may further comprise a selecting section operable to select whether the forming section forms the first monochrome image or the second monochrome image.

With this configuration, it is possible to select between the first monochrome image on which the sum total of the second ratios is made constant and the second monochrome image corresponding to the input first mixing ratio. Accordingly, the degree of freedom of forming a monochrome image can be enhanced.

In the image forming apparatus of the present invention, the plurality of color components are composed of three colors and may be either RGB or CMY in which luminance is determined by parameters of data of the plurality of colors.

The color components may be comprised of three colors in which luminance is determined by parameters of data of the plurality of colors, such as RGB or CMY.

In a case where one of the second ratios is continuously increased or decreased, the calculating section may continuously increase or decrease the others of the second ratios as well as the one of the second ratios, thereby maintaining the sum total of the second ratios to be substantially constant.

With this configuration, since the thus formed image is continuously and smoothly changed, it is possible to form a monochrome image according the intention of a user.

In a case where the respective first ratios are equal to each other, the calculating section may calculate the second mixing ratio so that the respective second ratios are equal to each other.

With this configuration, a monochrome image can be formed while a composition balance of the second ratios of the color components is being equally maintained as well as the first ratios. Therefore, it is possible to form a monochrome image according to the intention of a user.

The monochrome image may be a black and white image.

The calculating section may calculate the second ratios according to the following arithmetic expressions:

$$b'R = bR/(bR+bG+bB)+k;$$

$$b'G = bG/(bR+bG+bB)+k; \text{ and}$$

$$b'B = bB/(bR+bG+bB)+k,$$

where bR, bG and bB are the first ratios correspond to the respective color components, b'R, b'G, b'B are the second ratios correspond to the respective color components and k is a predetermined constant.

In a case where a relation of bR+bG+bB=0 is established, the value of (bR+bG+bB) may be replaced by a predetermined value except for 0.

The calculating section may calculate the second ratios according to the following arithmetic expressions:

$$b'R = bR - (\alpha bR + \beta bG + \gamma bB)/(\alpha+\beta+\gamma)+k;$$

$$b'G = bG - (\gamma bR + \alpha bG + \beta bB)/(\alpha+\beta+\gamma)+k; \text{ and}$$

$$b'B = bB - (\beta bR + \gamma bG + \alpha bB)/(\alpha+\beta+\gamma)+k,$$

where bR, bG and bB are the first ratios correspond to the respective color components, b'R, b'G, b'B are the second ratios correspond to the respective color components and k, α, β and γ are predetermined constants.

According to another aspect of the invention, there is also provided an image forming method comprising:

inputting a multicolor image;

inputting a first mixing ratio which includes first ratios for mixing each of a plurality of color components;

calculating a second mixing ration which includes second ratios for mixing each of the color components according to the input first mixing ratio so that the sum total of the second ratios is made to substantially constant; and mixing a plurality of color components of the multicolor image in response to the calculated second mixing ratio, thereby forming a first monochrome image.

According to a further aspect of the invention, there is provided a program product comprising a recording medium having recorded a program operable to cause a computer to execute the above method.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
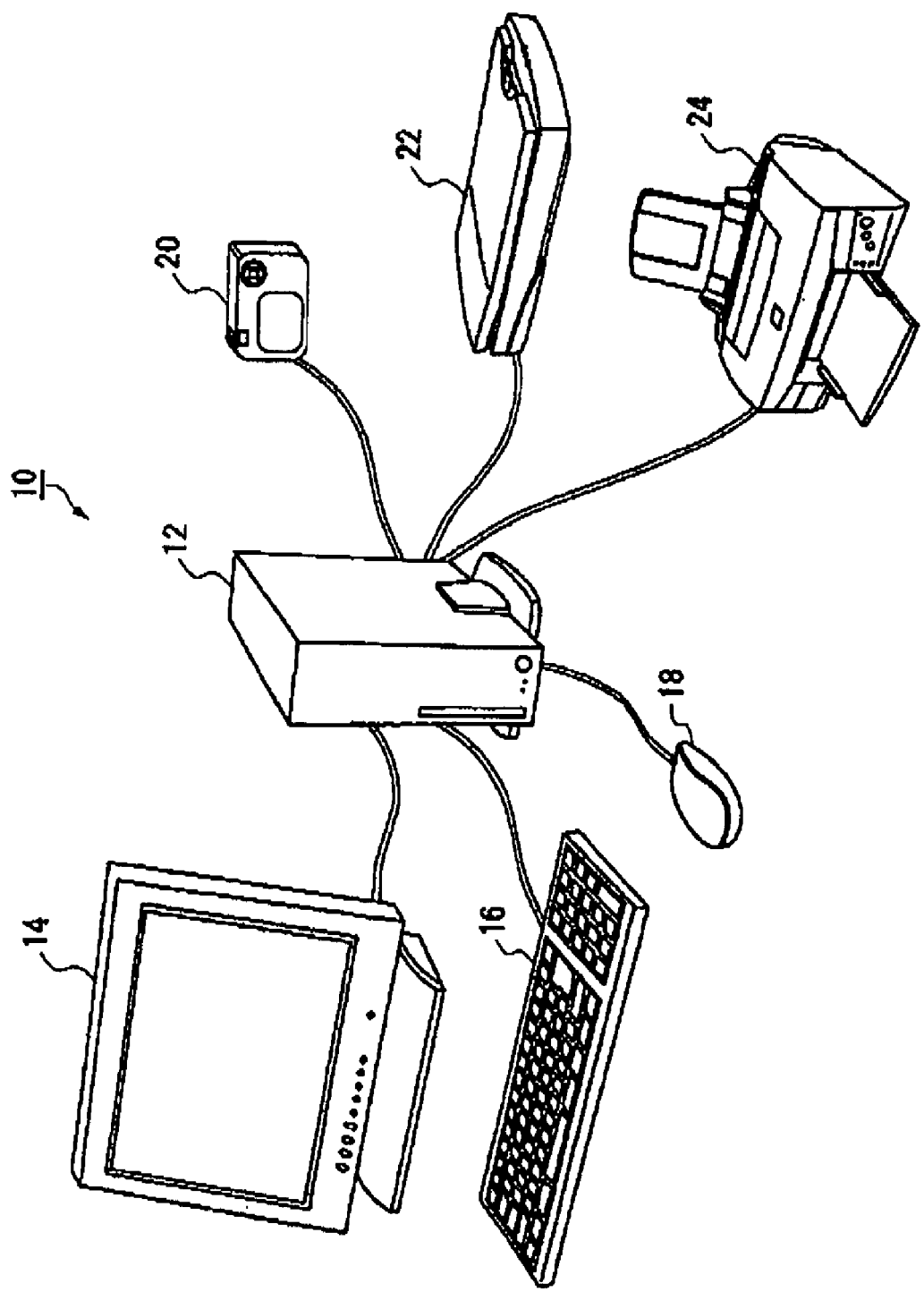
FIG. 1 is a view showing a constitution of an image processing apparatus to which the image forming apparatus according to an embodiment of the present invention is applied.

Referring to the drawings, an embodiment of the present invention will be explained below.

Embodiment

FIG. 1 is a view showing a constitution of an image processing apparatus 10 to which an image forming apparatus 5 (shown in FIG. 2) of the present invention is applied. As shown in FIG. 1, the image processing apparatus 10 seemingly includes: a computer 12 for executing a program to control the image processing apparatus 10; a display 14 for displaying information output from the computer 12; a printer 24 for printing information output from the computer 12; and a key board 16 and a mouse 18 through which a command is input into the computer 12 by a user of this image processing apparatus 10. Further, a digital camera 20 and a scanner 22, which are examples of the means for reading in images, are connected to the computer 12.

This computer 12 includes hardware although not shown in the drawing. This hardware includes: CPU (Central Processing Unit) for conducting operation; memories such as ROM (Read Only Memory), RAM (Random Access Memory) and flash memory; and a storage device such as a hard disk and a detachable memory card. The above hardware is connected through a bus so that signals can be received and given.

Therefore, processing of various information can be executed according to programs stored in the memory and the hard disk.

Figure 2:
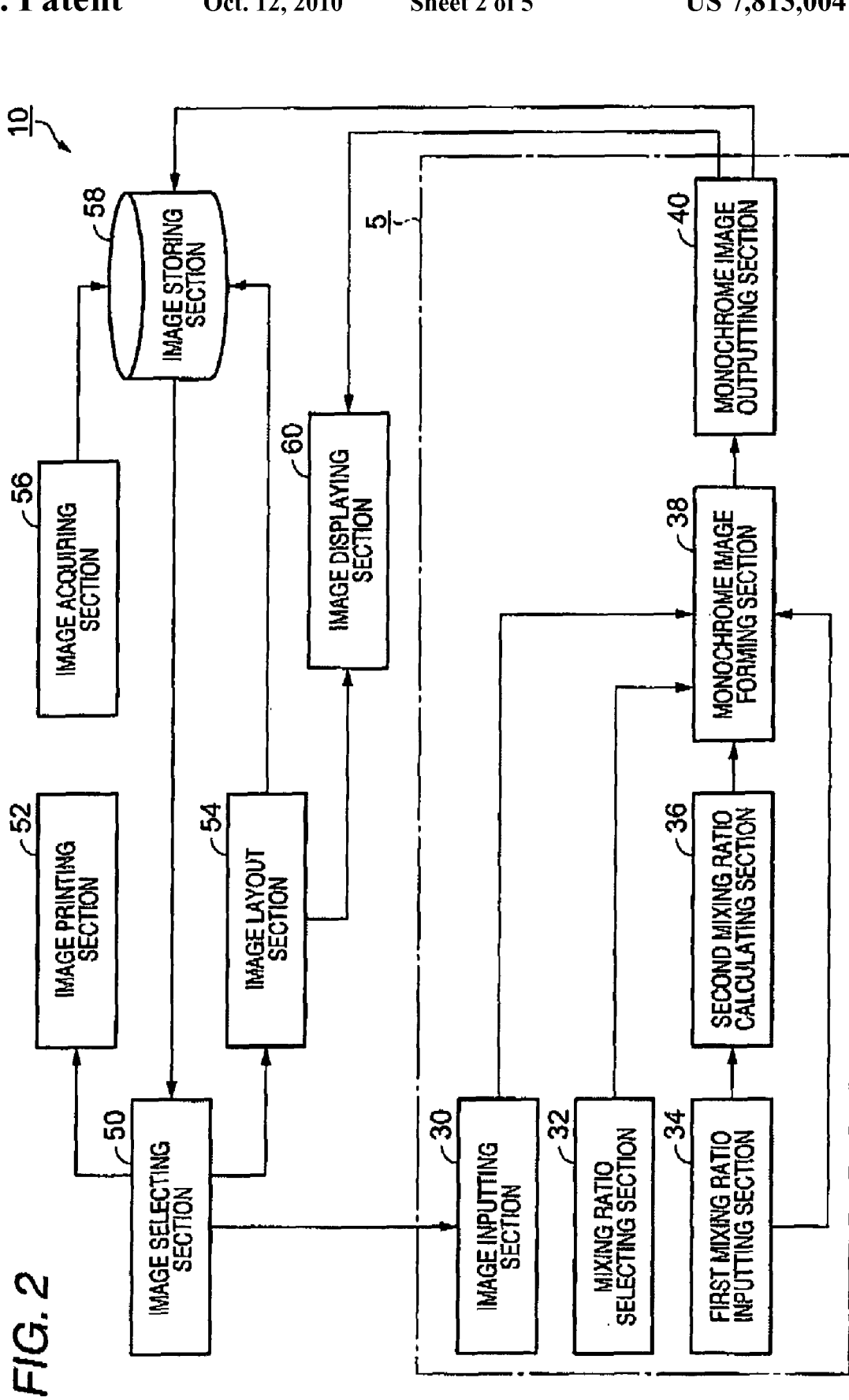
FIG. 2 is a block diagram showing a functional structure of the image processing apparatus.

FIG. 2 is a block diagram showing a functional structure of the image processing apparatus 10. The image forming apparatus 5 is applied to this image processing apparatus 10. This image forming apparatus 5 includes: an image input section 30; a mixing ratio selecting section 32; a first mixing ratio input section 34; a second mixing ratio input section 36; a monochrome image forming section 38; and a monochrome image outputting section 40, wherein the image forming apparatus 5 forms a monochrome image corresponding to a desired ratio for each of basic colors with respect to a multicolor image input. In this case, the monochrome image is estimated to be a black and white image of the achromatic color containing gray or an image displayed only by a predetermined color. However, in order to simplify the following explanation and facilitate the understanding, the monochrome image is estimated to be the black and white image here. The image processing apparatus 10 includes: an image selecting section 50 in which an image is selected by a user; an image printing section 52 in which an image is printed; an image layout section 54 in which an image is laid out; an image acquiring section 56 for acquiring image data; an image data storing section 58 for storing image data; and an image display section 60. Functions of these functional sections can be realized when the aforementioned hardware and software are organically in cooperation with each other.

First, each of functional sections of the image forming apparatus 5 will be explained below. Multicolor image data formed out of pixels having a plurality of color components is input to the image input section 30. In this embodiment, this multicolor image data is input to and stored in the image storing section 58 and selected from the images, which can be selected in the image selecting section 50, by a user. Data of the multicolor image, which is input here, is sent to the monochrome image forming section 38.

The first mixing ratio input section 34 is input with a first mixing ratio representing ratios for mixing a plurality of basic colors. In the present embodiment, basic colors composing the color components are the three primary colors of red (R), green (G) and blue (B). However, the basic colors are not restricted to the above three primary colors but it is possible to adopt a combination of the three colors of cyan (C), magenta (M) and yellow (Y). Further, the basic colors are not necessarily restricted to the three colors. Black (K), white (W) and others may be added. The ratios of mixing is represented by percentage (%). The first mixing ratio with respect to the respective basic colors is input by the user. The first mixing ratio input here is sent to the second mixing ratio calculating section 36 and the monochrome image forming portion 38.

The second mixing ratio calculating section 36 calculates the second mixing ratios for each of the basic colors according to the first mixing ratio input at the first mixing ratio input section 34 so that the sum total of the second mixing ratios can become constant. The thus calculated second mixing ratios are sent to the monochrome image forming portion 38. To be more specific, in a case where a mixing ratio of one basic color in the second mixing ratios is continuously increased or decreased, the second mixing ratio calculating section 36 continuously increases or decreases the mixing ratios of the residual basic colors as well as the mixing ratio of the one basic color. Due to the foregoing, the sum total of the second mixing ratios can be maintained constant. In a case where the ratios of the first mixing ratio are respectively equal to each other, the second mixing ratio calculating section 36 calculates so that the second mixing ratios can become respectively equal to each other. In a case where a black and white image is formed out of a color image, in an arbitrary region on the black and white image, values of luminance of the respective basic colors (R, G. B) are equal to each other. When the value of luminance of each basic color is K, the following expression can be established.

$$r2 \times R + g2 \times G + b2 \times B + N = K \quad \text{(Expression 1)}$$

In this case, R, G and B represent mixing quantities (blending quantities) of respective pixel components of red, green and blue. Further, r2, g2 and b2 represent mixing ratios (%) with respect to the respective pixel components. Furthermore, N represents a predetermined value showing a ground color of the objective image. For example, in a case where the image is a positive image, N is 0. In a case where the image is a negative (reverse) image, N is 256. In the present invention, in order to suppress a decrease in the luminance so as to maintain the visibility of the image, it is necessary to maintain the sum total of the second mixing ratios. Therefore, the following relation is maintained.

$$r2 + g2 + b2 \approx 100 (\%) \quad \text{(Expression 2)}$$

In this case, when the mixing ratios of the basic colors (R, G, B) input by a user in the first mixing ratio input section 34 are represented by r1, g1 and b1(%), the second mixing ratio of each basic color can be calculated by the following expressions (Expression 3).

$$r2 = r1 - (r1 + g1 + b1)/3 + k \ (\%) \quad \text{(Expression 3)}$$

$$g2 = g1 - (r1 + g1 + b1)/3 + k \ (\%) \quad \text{(Expression 3)}$$

$$b2 = b1 - (r1 + g1 + b1)/3 + k \ (\%) \quad \text{(Expression 3)}$$

In this connection, in the present embodiment, in a state in which the image processing apparatus 10 is started, all of r1, g1 and b1 are set at 0. Therefore, at the initial stage, as shown in the above expressions, all of r2, g2 and b2 become 33%. In this connection, concerning k described in the above expression, in a case where (r1+g1+b1) is a positive value or 0, a positive value (+33) is employed. In a case where (r1+g1+b1) is a negative value, a negative value (−33) is employed. In this case, in a case where only the ratio of the red pixel component is added by q %, the mixing ratio of each basic color is represented by the following expression (Expression 4). Even when the mixing ratio of each basic color is changed, the sum total of mixing quantities of the respective basic colors can be maintained to be substantially the same. Therefore, the luminance of a black and white image can be maintained.

$$r2 : g2 : b2 = (33 + 2 \times q/3) : (33 - q/3) : (33 - q/3) \quad \text{(Expression 4)}$$

The second mixing ratios of respective basic colors are not necessarily restricted by the above expression. In order to maintain the relation of each of ratios, the following expressions (Expression 5) can be employed.

$$r2 = r1/(r1 + g1 + b1) + k \ (\%) \quad \text{(Expression 5)}$$

$$g2 = g1/(r1 + g1 + b1) + k \ (\%) \quad \text{(Expression 5)}$$

$$b2 = b1/(r1 + g1 + b1) + k \ (\%) \quad \text{(Expression 5)}$$

In this case, in a case where (r1+g1+b1) is 0, the second mixing ratio calculating section 36 replaces the value with a predetermined value except for 0, for example, the second mixing ratio calculating section 36 replaces the value with a previously determined value for each combination of r1, g1 and b1. Further, it is possible to employ the following expressions (Expression 6) in which a, b and c are respectively set at a predetermined constant.

$$r2 = r1 - (a \times r1 + b \times g1 + c \times b1)/(a+b+c) + k \ (\%) \quad \text{(Expression 6)}$$

$$g2 = g1 - (c \times r1 + a \times g1 + b \times b1)/(a+b+c) + k \ (\%) \quad \text{(Expression 6)}$$

$$b2 = b1 - (b \times r1 + c \times g1 + a \times b1)/(a+b+c) + k \ (\%) \quad \text{(Expression 6)}$$

A user can select whether the mixing ratio selecting section 32 selects that a monochrome image, which is formed by the monochrome image forming section 38, is formed according to the ratios of the first mixing ratio or the second mixing ratios. Information selected here is sent to the monochrome image forming section 38.

The monochrome image forming section 38 forms a black and white image from multicolor image data, which is sent (input) from the image input section 30, according to the mixing ratio selected by the mixing ratio selecting section 32. Data of the black and white image formed here is sent to the image storing section 58 through the monochrome image outputting section 40 and stored there. Alternatively, data of the black and white image formed here is sent to the image displaying section 60 and displayed there. Data of the monochrome image, which is formed and stored in this way, is selected by the user in the image selecting section 50 according to the necessity. After that, the data of the monochrome image may be laid out in the image layout section 54 or printed in the image printing section 52.

Figure 3:
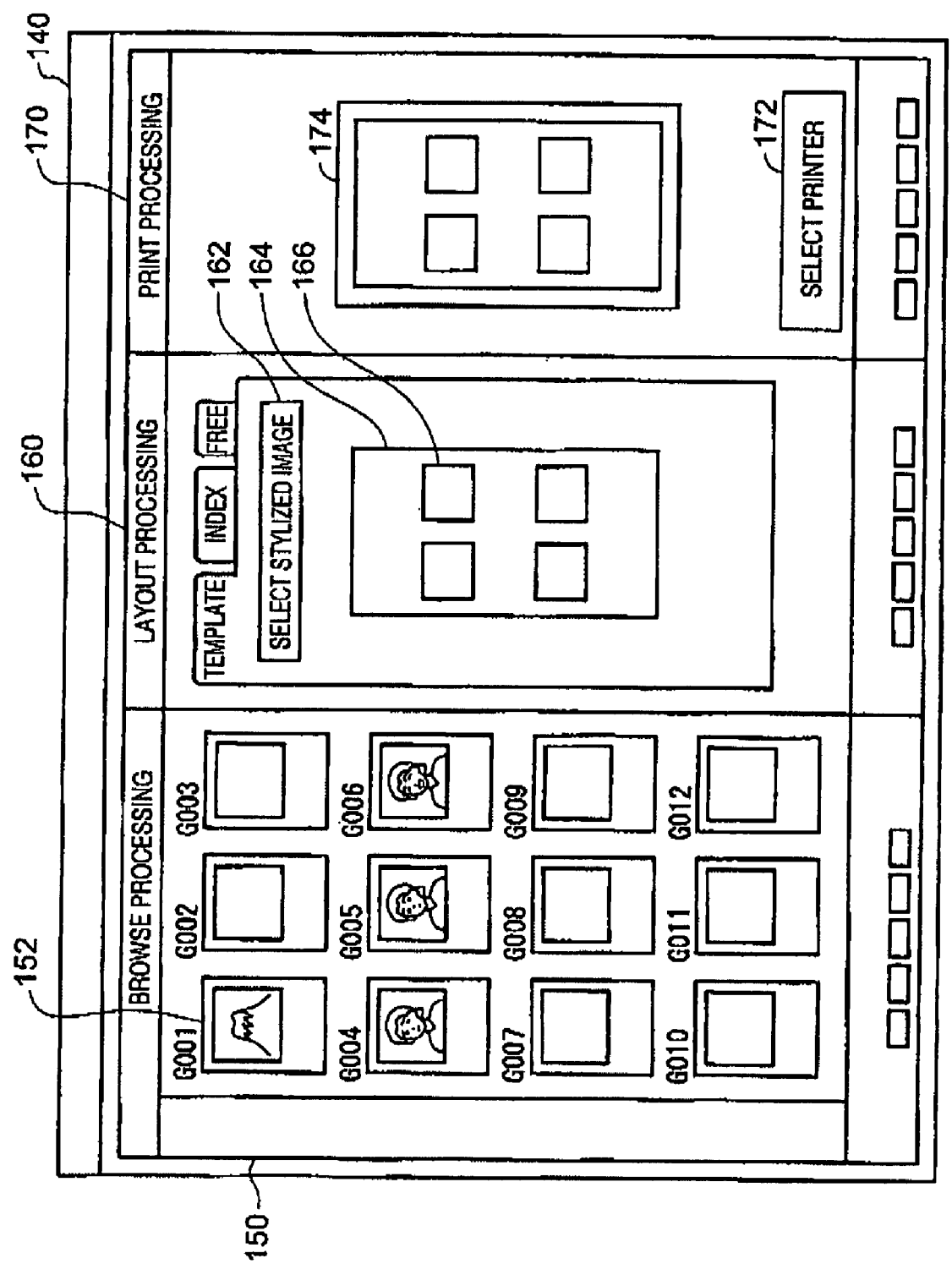
FIG. 3 is a view showing a main window displayed on an image screen of a display.

In the present embodiment, in the functions described above, a function to act according to a direction given by the user is displayed on the display 14 and realized through a window having an interface capable of accepting the direction given by the user. FIG. 3 is a view showing a main window 140 displayed on an image screen of the display 14. This main window 140 is displayed on the display 14 when a program to control the image processing apparatus 10 is started. This main window 140 includes: a browse processing region 150 regarding a browse processing; a layout processing region 160 regarding a layout processing; and a print processing region 170 regarding a print processing.

The browse processing region 150 has a function of the image selecting section 50. In the browse processing region 150, images 152, which are stored in the image storing section 58 and capable of being selected, are displayed in a predetermined order so that the images 152 can be selected. The layout processing section 160 displays a stylized image selecting region 162 for selecting a template and also displays a composite image display region 164 in which a selected image 166 is poured onto the template. Further, the print processing region 170 has a function of the image printing section 52. The print processing region 170 displays a printer selecting region 172 for selecting a printer 24 to be used for printing and also displays a print image region 174 showing an image printed by the printer 24 selected by this printer selecting region 172.

Figure 4:
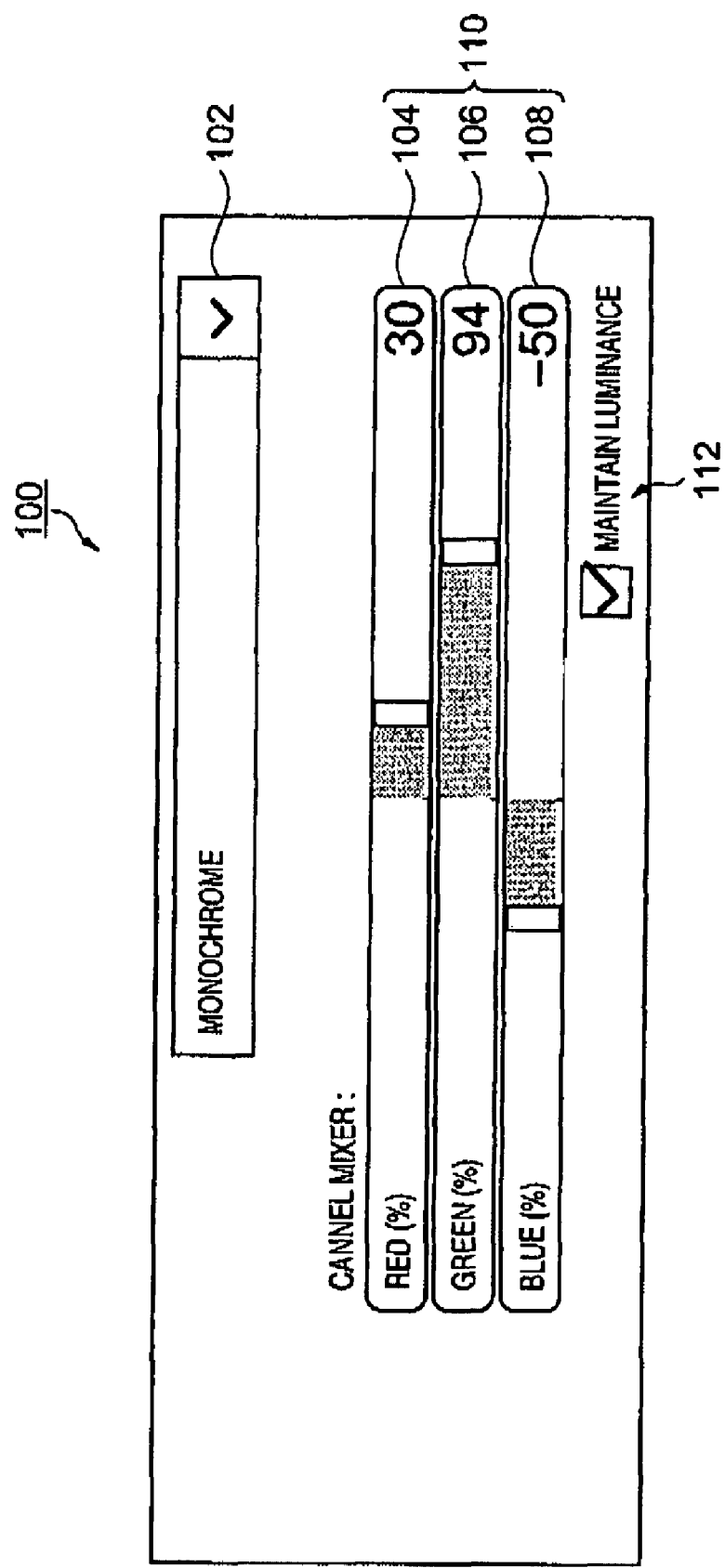
FIG. 4 is a view showing a monochrome image forming window capable of setting a function of the image forming apparatus.

FIG. 4 is a view showing a monochrome image forming window 100 capable of setting a function of the image forming apparatus 5. This monochrome image forming window 100 displays an image, which is selectively displayed in the browse processing region 150, on the display 14 by conducting a double click with the mouse 18. Further, although not shown in the drawing, on the display image screen of the display 14, an image display section 60 is displayed together with this monochrome image forming window 100. This monochrome image forming window 100 displays a monochrome mode selecting region 102, a channel mixer 110 having a function of the first mixing ratio input section 84 and a luminance maintaining selecting region 112 having a function of the mixing ratio selecting section 32. This channel mixer 110 includes: a region 104 for setting a mixing ratio of red in the first mixing ratio; a region 106 for setting a mixing ratio of green in the first mixing ratio; and a region 108 for setting a mixing ratio of blue in the first mixing ratio. These regions (104, 106, 108) are respectively composed of a slider. Therefore, a user can set a desired mixing ratio for each basic color. In this connection, in a case where the sum total of the values which have been set in these regions (104, 106, 108) is negative, a negative image is formed. In a case where the sum total of the values which have been set in these regions (104, 106, 108) is positive, a positive image is formed.

The luminance maintaining selecting region 112 is provided with a check box. When the user has checked in the check box, a monochrome image is formed according to the second mixing ratios calculated in the second mixing ratio calculating section 36. On the other hand, when the user has removed a check from the check box, a monochrome image is formed according to the mixing ratios of the first mixing ratio input in the first mixing ratio input section 34. In this connection, the monochrome mode selecting region 102 can select not only the black and white mode but also the color mode for adjusting a balance of each basic color with respect to a color image.

Figure 5:
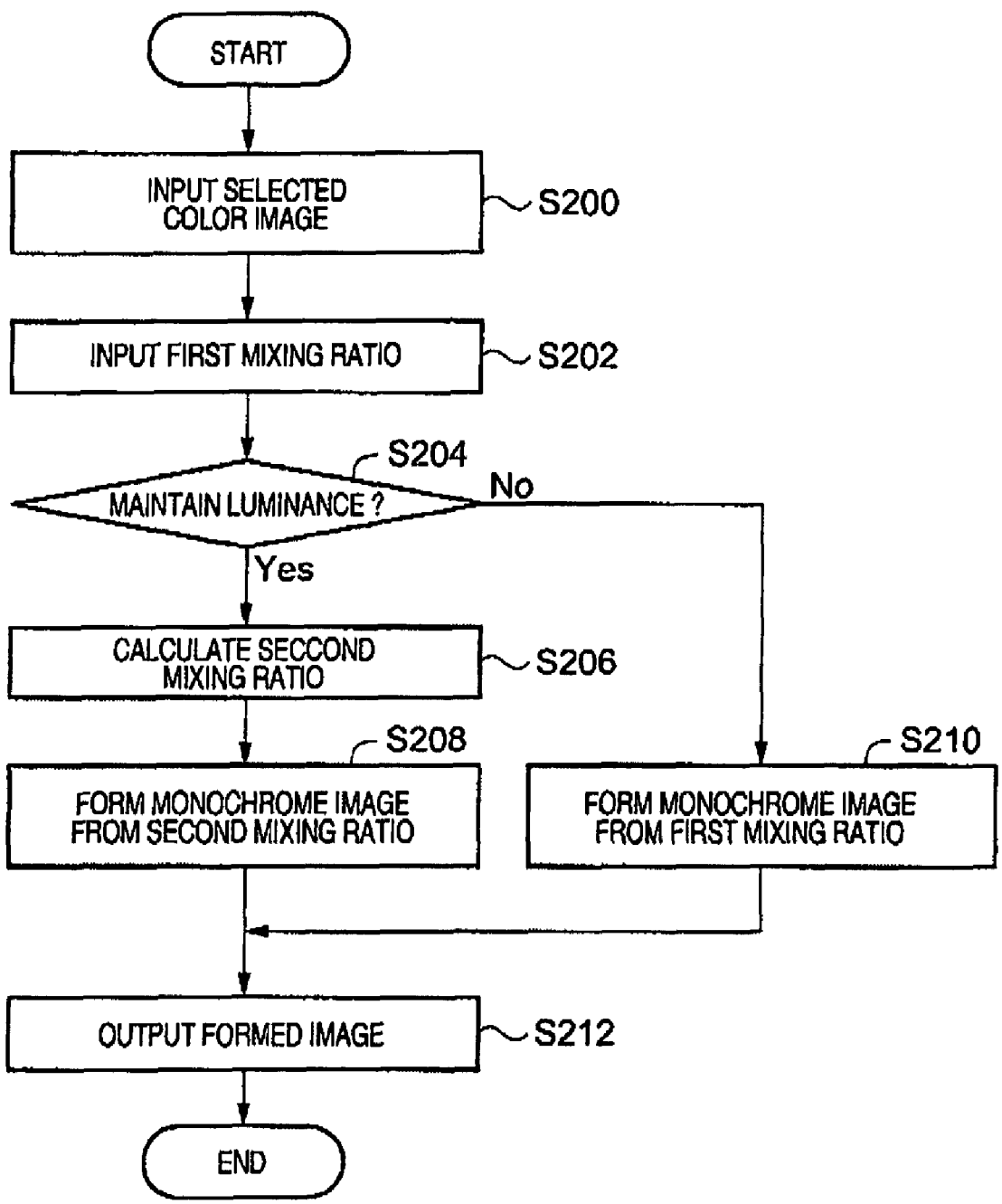
FIG. 5 is a flow chart showing a flow of processing in which a monochrome image is formed.

FIG. 5 is a flow chart showing a processing in which a black and white image is formed by the image forming apparatus 5. When the processing is executed, first, data of a color image selected in the image selecting section 50 is input into the image input section 30 (step S200).

A color image shown by the input data is sent to the monochrome image forming section 38 and displayed in the image display section 60. Mixing ratios of respective basic colors of the color image is input from the first mixing ratio input section 34 by a user watching this image (step S202).

Next, it is judged whether or not the mode, in which the luminance is maintained, is directed by the user, that is, it is judged whether or not the user has directed to form a black and white image according to the second mixing ratio (step S204). In a case where the mode to maintain the luminance is not selected (NO in step S204), based on the mixing ratios of respective basic colors input at the first mixing ratio input section 34, a black and white image is formed at the monochrome image forming section 38 according to Expression 1 (step S210). Successively, the formed image is output (step S212). In this way, a series of processing is completed.

On the other hand, in a case where the mode for maintaining the luminance is selected (YES in step S204), the second mixing ratios are calculated in the second mixing ratio calculating section 36 according to Expression 3 (step S206). Successively, according to the second mixing ratios that have been calculated in this way, a black and white image is formed in the monochrome image forming section 38 by Expression 1 (step S208). The thus formed image is output (step S212). In this way, a series of processing is completed.

According to the embodiment described above, the following advantages can be provided.

Since the aforementioned operation and data processing are executed by the computer 12, a black and white image can be quickly formed from a multicolor image. Since data of the thus formed monochrome image can be stored in the computer 12, the present invention can be applied to not only the appreciation of a monochrome image but also the analysis and investigation of the image.

The present invention has been explained above referring to the embodiment shown in the drawings. However, it should be noted that the present invention is not limited to the above specific embodiment. Variations can be made as follows.

The image forming apparatus 5 is not limited to the present embodiment described above. For example, functions of the image forming apparatus 5 may be integrated into an electronic circuit and formed into a chip such as an integrated circuit.

What is claimed is:

1. An image forming apparatus comprising:
   an image input section operable to input a multicolor image;
   a mixing ratio input section operable to input a first mixing ratio which includes first ratios for mixing each of a plurality of color components;
   a calculating section operable to calculate a second mixing ratio which includes second ratios for mixing each of the plurality of color components according to the input first mixing ratio so that a sum total of the second ratios is made to be substantially constant; and
   a forming section operable to mix the plurality of color components of the multicolor image in response to the calculated second mixing ratio, thereby forming a first monochrome image;
   wherein in a case where the first ratios of each of the plurality of color components are equal to each other, the calculating section calculates the second mixing ratio so that the second ratios of each of the plurality of color components are equal to each other.

2. The image forming apparatus as set forth in claim 1, wherein:
   the forming section is operable to mix the color components of the multicolor image in response to the input first mixing ratio, thereby forming a second monochrome image; and
   the image forming apparatus further comprises a selecting section operable to select whether the forming section forms the first monochrome image or the second monochrome image.

3. The image forming apparatus as set forth in claim 1, wherein the plurality of color components are comprised of three colors which are one of RGB and CMY.

4. The image forming apparatus as set forth in claim 3, wherein the calculating section calculates the second ratios according to the following arithmetic expressions:

$$b'R = bR/(bR+bG+bB)+k;$$

$$b'G = bG/(bR+bG+bB)+k;\text{ and}$$

$$b'B = bB/(bR+bG+bB)+k,$$

where bR, bG, and bB are the first ratios corresponding to each of the plurality of color components, b'R, b'G, and b'B are the second ratios corresponding to each of the plurality of color components, and k is a predetermined constant.

5. The image forming apparatus as set forth in claim 4, wherein in a case where a relation of bR+bG+bB=0 is established, the value of (bR+bG+bB) is replaced by a predetermined value except for 0.

6. The image forming apparatus as set forth in claim 3, wherein the calculating section calculates the second ratios according to the following arithmetic expressions:

$$b'R = bR \cdot (\alpha bR + \beta bG + \gamma bB)/(\alpha+\beta+\gamma)+k;$$

$$b'G = bG \cdot (\gamma bR + \alpha bG + \beta bB)/(\alpha+\beta+\gamma)+k;\text{ and}$$

$$b'B = bB \cdot (\beta bR + \gamma bG + \alpha bB)/(\alpha+\beta+\gamma)+k,$$

where bR, bG, and bB are the first ratios corresponding to each of the plurality of color components, b'R, b'G, and b'B are the second ratios corresponding to each of the plurality of color components, and k, α, β, and γ are predetermined constants.

7. The image forming apparatus as set forth in claim 1, wherein in a case where one of the second ratios is continuously increased or decreased, the calculating section continuously increases or decreases others of the second ratios as well as the one of the second ratios, thereby maintaining the sum total of the second ratios to be substantially constant.

8. The image forming apparatus as set forth in claim 1, wherein the first monochrome image is a black and white image.

9. An image forming method comprising:

inputting a multicolor image;

inputting a first mixing ratio which includes first ratios for mixing each of a plurality of color components;

calculating a second mixing ratio which includes second ratios for mixing each of the plurality of color components according to the input first mixing ratio so that a sum total of the second ratios is made to be substantially constant; and mixing a plurality of color components of the multicolor image in response to the calculated second mixing ratio, thereby forming a first monochrome image;

wherein in a case where the first ratios of each of the plurality of color components are equal to each other, the second mixing ratio is calculated so that the second ratios of each of the plurality of color components are equal to each other.

10. A program product comprising a recording medium having recorded thereon a program operable to cause a computer to execute the method as set forth in claim 9.

* * * * *